United States Patent [19]

Jae Young

[11] Patent Number: 5,611,367
[45] Date of Patent: Mar. 18, 1997

[54] IN-LINE VALVE FOR A MASTER CYLINDER

[75] Inventor: Choi Jae Young, Seoul, Rep. of Korea

[73] Assignee: Mando Machinery Corporation, Rep. of Korea

[21] Appl. No.: 579,006

[22] Filed: Dec. 27, 1995

[30]     Foreign Application Priority Data

Dec. 27, 1994 [KR]   Rep. of Korea ................. 1994-36426

[51] Int. Cl.⁶ ................................................. G05D 16/10
[52] U.S. Cl. ....................... 137/505.25; 60/591; 251/337; 303/9.75
[58] Field of Search ......................... 60/591; 137/505.25; 251/337; 303/9.62, 9.75; 267/158, 164, 165

[56]               References Cited

U.S. PATENT DOCUMENTS

| | | | |
|---|---|---|---|
| 4,238,991 | 12/1980 | Pickles | 267/165 X |
| 4,791,957 | 12/1988 | Ross | 137/505.25 X |
| 5,018,796 | 5/1991 | Ishimaki et al. | 303/9.75 |
| 5,083,740 | 1/1992 | Sawyer et al. | 267/164 X |

*Primary Examiner*—Gerald A. Michalsky
*Attorney, Agent, or Firm*—Irving Keschner

[57]                ABSTRACT

The invention relates to an in-line valve connected to a master cylinder for exhibiting the braking of automobile. The in-line valve is comprised of a body 20, a piston 30 installing slidably in the body and a plate spring 40 having a low height for supporting the linear movement of the piston.

2 Claims, 2 Drawing Sheets

FIG. 1
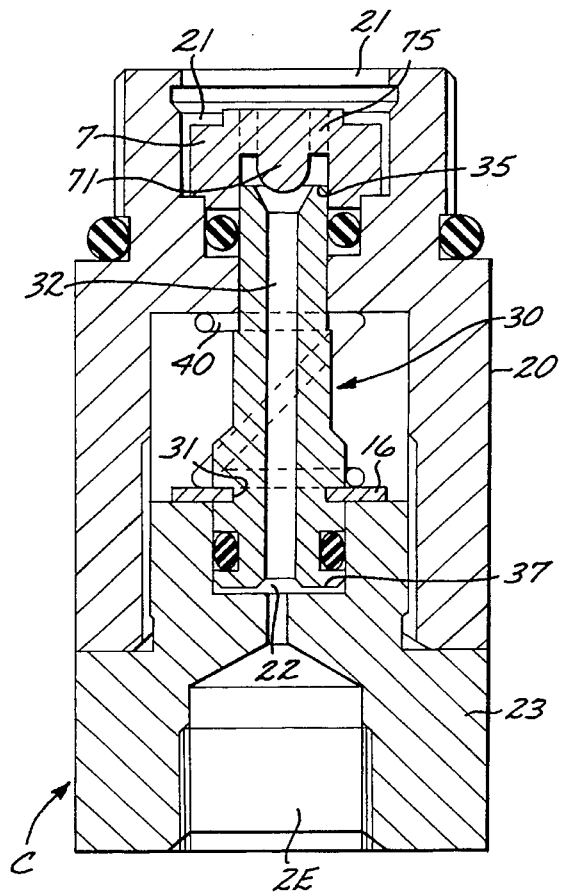
FIG. 2
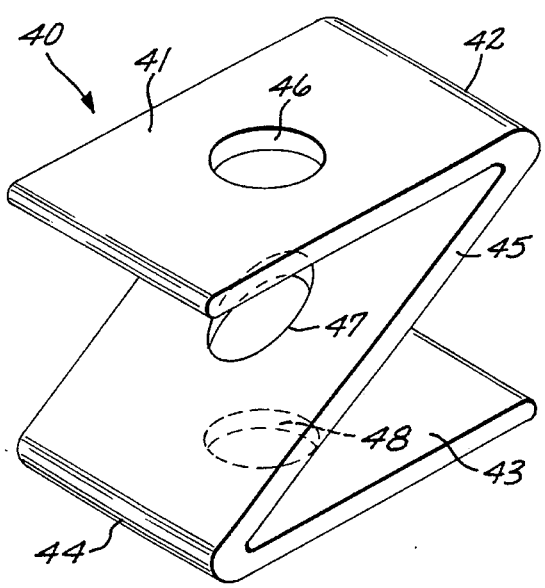
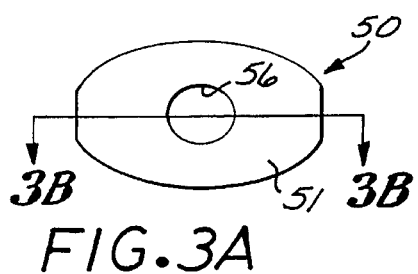
FIG. 3A
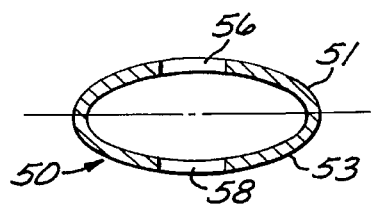
FIG. 3B
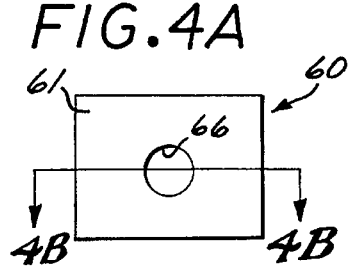
FIG. 4A
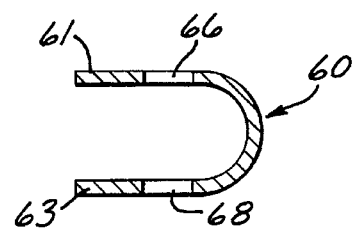
FIG. 4B

IN-LINE VALVE FOR A MASTER CYLINDER

BACKGROUND OF THE INVENTION

The invention is related to an in-line valve for a master cylinder, more particularly to an in-line valve which is connected to an outlet of a master cylinder for transferring the oil pressure for braking the wheels, thereby controlling the oil pressure by the resilience of a spring.

In general, a master cylinder generates pressure according to the amount of pressure applied to the brake pedal which brakes the front and rear wheels by the compressed oil. If the same pressure is applied to both front and rear wheels during braking, the rear wheels could jump above the ground. So, to reduce the pressure for the rear wheels an in-line valve is arranged between the master cylinder and rear wheels for controlling the pressure applied the rear wheels.

In FIGS. 5 and 6, as the brake pedal (not shown) is pressed, a push rod 9 pushes a first piston 5 in the left side so as to operate a wheel cylinder (disk) of a rear wheel. A predetermined gap between a first cylinder 5 and a second cylinder 6 is held for preventing the delay of two pistons.

At a portion in which a first piston 5 is placed, a first outlet 11 for discharging compressed oil is provided for braking the rear left wheel, while at a portion in which a second piston 6 is placed, a second outlet 12 for discharging compressed oil is provided for braking the rear right wheel The in-line valve "A", for controlling the pressure of the discharging oil, is installed at the first and second outlets 11, 12, respectively.

The in-line valve "A" is comprised of a body 2 having a first port 2I communicating with the first or second outlet 11, 12 and a second port 2E connecting an oil passage for the rear wheels (not shown). A poppet valve 7 is provided in an opening of the body 2 adjacent to the first port 2I, which is supported by a spring (not shown). A piston 3 is slidably arranged in the body 2 and has a penetrated channel 32 for communicating both the first port 2I and the second port 2E. A resilient means 4 or compression coil spring is provided around the piston 3 and gives force to a support plate 16 fitted in a circular notch 31, thereby pushing the piston 3 toward the second port 2E. In normal mode, an upper end or a ring-shaped end 35 of the piston 3 is positioned away from a protrusion 71 of the piston 7 and so a first chamber 21 formed between the poppet valve 7 and the upper end 35 is communicated with the passage 32. Further, at the second port 2E, a cap 23 is provided for supporting the plate 16 and guiding the movement of the piston 3.

In the above configured in-line valve "A", oil in the master cylinder is compressed as the brake pedal (not shown) is pressed and the compressed oil is transferred to the first chamber 21 through the passage 75 of the poppet valve 7. The compressed oil is further transferred toward the second chamber 22 adjacent to a lower end or a ring-shaped end 37 through the passage 32. Since the area of the upper ring-shaped end 35 is smaller than that of the lower ring-shaped end 37, the piston is pushed up to the first chamber 21 so that the passage 32 adjacent to the upper ring-shaped end 35 is sealably contacted with the protrusion 71. Thus, the transfer of the oil pressure from the first port 2I to the second port 2E is interrupted. That is, the pressure of the master cylinder is transferred to the front wheels at the same value, but is transferred to the rear wheels at a reduced pressure value.

Next, in the interrupted mode, that is, since the second port 2E or the second chamber 22 does not communicate with the first chamber 21, the pressure in the second chamber 22 is held constant. As the brake pedal is continuously pressed, the pressure of the first port 2I steadily increased and the piston 3 is moved to the second chamber 22 so that the first chamber 21 communicates with the second chamber 22. Subsequently, the increased oil pressure is applied on the lower ring-shaped end 37 and the piston 3 is moved up so that the passage 32 adjacent to the upper ring-shaped end 35 contacts on the protrusion 71, thereby interrupting the pressure transfer between the first chamber 21 and the second chamber 22. As a result of the repetition of the above process, the pressure transferred from the master cylinder to the rear wheels is controlled.

As resilient means for supporting the slidable piston in-line valve, a compression coil of relatively long length is employed. In order to reduce the volume of the in-line valve, it is necessary to reduce the length of the spring. To exhibit the same resilient force even in the relatively short length spring the diameter of the wire must be increased. However, if the solid length of the spring having a larger wire diameter is longer than the maximum stroke of the piston, each adjacent wire of the coil spring is excessively contacted in the maximum stroke mode and the coil spring buckles in a traverse direction to the vertical applied force on the end surfaces.

SUMMARY OF THE INVENTION

An object of the invention is to provide an in-line valve to eliminate a buckling of the spring even during the maximum stroke of the piston and to bring about the normal operation of the spring.

Further, another object of the invention is provide an in-line valve employing a relatively short length spring in order to lessen the volume of the in-line valve, thereby maximizing the volumetric utility for installation in the vehicle chassis.

In order to accomplish these objects and features, an in-line valve of a master cylinder comprises a body having a first port communicating with an outlet of master cylinder and a second port communicating with an oil passage for rear wheels;

a piston arranged slidably in the body, the piston having an internal passage intercommunicating the first and second ports;

a poppet valve placed adjacent to the first port and making contact with the internal passage of the piston; and a resilient means arranged around the piston for separating the piston and the poppet valve;

the resilient means further is constructed of a single piece having an upper portion, a lower portion in symmetry against the upper portion with parallel surface, a vertical section of the resilient means is configured in an oval shape and respective openings formed in the upper and lower portions for guiding the piston.

Alternatively, the resilient means is constructed of a single piece having a pair of parallel portions, one end of the one parallel portion connecting with an other end of the parallel portion, a vertical section of the resilient means is configured in a U shape, and further has respective openings formed in respective parallel portions for guiding the piston.

More alternatively, the resilient means is constructed of a single piece having a pair of parallel portions and a slanted portion in which one end of the one parallel portion is connected with the other end of the other parallel portion, a vertical section of the resilient means is configured in the shape of a Z, and further having an opening formed in respective parallel portions with a slanted portion for guiding the piston.

BRIEF DESCRIPTION OF THE INVENTION

FIG. 1 is a side sectional view of an in-line valve according to the invention;

FIG. 2 is a perspective view of the spring of FIG. 1;

FIG. 3A is a plane view of the spring in another embodiment of FIG. 1;

FIG. 3B is a front sectional view of a spring of FIG. 3A;

FIG. 4A is a plane view of the spring in another embodiment of FIG. 1;

FIG. 4B is a front sectional view of the spring of FIG. 4A;

DESCRIPTION OF THE PREFERRED EMBODIMENT

Figure 5:
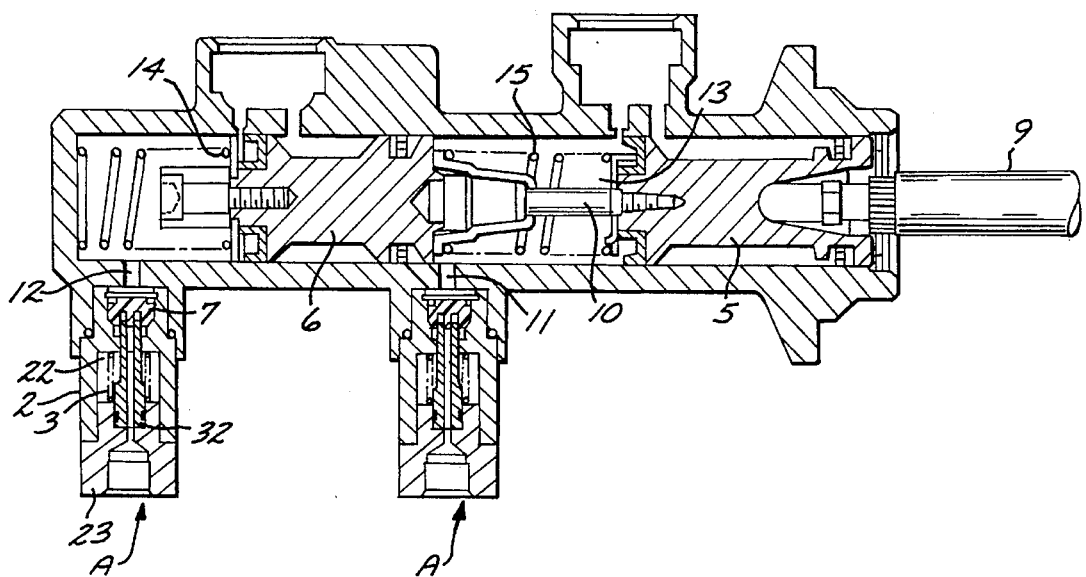
FIG. 5 is a sectional view of a master cylinder embodying a prior art in-line valve.
Figure 6:
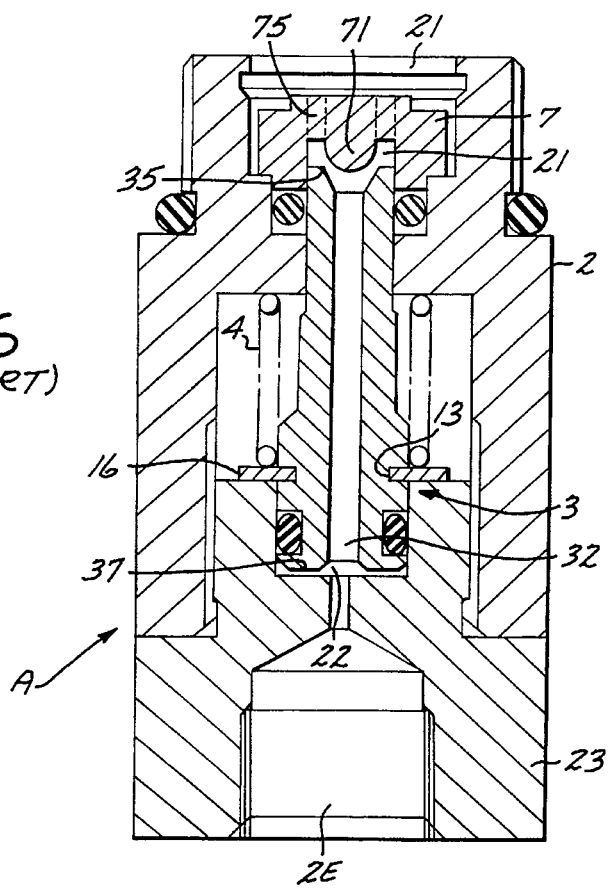
FIG. 6 is a side sectional view of the in-line valve of FIG. 5.

An in-line valve adapted to the invention is similar to a conventional in-line valve, as shown in FIG. 5, except for the structure of the spring. Thus, it will now be explained with numbers being referenced to the same elements.

FIG. 1 illustrates the in-line valve embodying a spring of the invention. The in-line valve "C" is comprised of a body 20 having port 2I communicating with the master cylinder and a second port 2E connecting to an oil passage (not shown). A piston 30 is slidably arranged in the body 20. Around the piston 30 is provided a resilient means 40 for pushing the piston 30 toward the second port 2E.

The resilient means 40, as shown in FIG. 2, is comprised of a pair of parallel portions 41, 43 and a slanted portion 45 in which one end 42 of the parallel portion 41 is connected with other end 44 of the parallel portion 43. Further, openings 46, 48 are formed at the central area of respective parallel portions 41, 43 for guiding the piston 30. More, at the slanted portion 45 is formed an opening 47 for guiding the piston 30. The resilient means 40 is configured with a plate spring constructed by a single piece.

Alternatively, the resilient means can be in the form of a spring 50 as shown in FIGS. 3A and 3B. The spring 50 comprises an upper portion 51 and a lower portion 53 symmetrical about the horizontal plane shown in the FIG. 3B. The vertical cross section of the spring is oval. The spring may be formed in a single piece.

Further, at central area of respective upper and lower portions 51, 53 are provided openings 56, 58 for guiding the piston 30.

More alternatively, the resilient means can employ a spring 60 shown in FIGS. 4A and 4B. The spring 60 is comprised of a pair of parallel portions 61, 62 which are connected with each end of respective parallel portions 61, 63. That is, the vertical cross is a U shape. Further, at a pair of parallel portions 61, 63 are provided openings 66, 68 for guiding the piston 30.

The in-line valve "C" employing the above configuration is operated as follows:

A brake pedal is pressed and the compressed pressure is transferred to the first port 2I through the first and second outlets 12, 11 (FIG. 5). The oil pressure is transferred to the first chamber 21 via the passage 75 of the poppet valve 7 and simultaneously is transferred to the second chamber 22 with the same pressure. However, because the area of the upper ring-shaped end 35 is smaller than that of the lower ring-shaped end 37, the piston 30 is moved up when the force of the lower ring-shaped end 37 can overcome the total force of the upper ring-shaped end 35 and of the spring 40 or 50 or 60. So, the passage 32 adjacent to the upper ring-shaped end 35 is sealably contacted with the protrusion 71. Therefore, the transfer of the oil pressure from the first port 2I to the second port 2E is interrupted, so no increasing pressure of the master cylinder can be transferred to the rear wheels (not shown). The linear movement range of the piston 30 is smaller due to the low height of the spring, but the proper movement of the piston 30 is obtained because of the strong elastic force of the spring.

Next, the brake pedal is continuously pressed so as to steadily increase the pressure of the master cylinder. The increasing pressure overcomes the constant pressure of the second chamber 22, and the piston 30 is pushed to the second port 2E. So, the passage 32 adjacent to the upper ring-shaped end 35 distances away from the protrusion 71 so that the pressure of the first chamber 21 is transferred to the second chamber 22. Thereafter, the increasing pressure pushes up the piston 30 according the area difference between the area of the upper ring-shaped end 21 and that of the lower ring-shaped end 22. Again, the communication between the first chamber 21 and the second chamber 22 is interrupted.

The respective movement of the piston can control the pressure transferred to the rear wheels. Since the elastic force of the spring is greater, the piston is restored to the initial tension before the adjacent constituent parts are contacted with each other.

Because the resilient means 40, 50, 50 having strong force even with the relatively short length is employed for achieving proper linear movement of the piston, the volume of the in-line valve is reduced. Further, even when the piston is in the maximum stroke or the piston is moved up, the parallel portions 41, 43, 61, 63 or the upper/lower portions 51, 53 of the resilient means 40, 50, 60 can not be contacted each other and the buckling can be prevented even when in the maximum compression force.

What is claimed is:

1. An in-line valve of a master cylinder comprising:
  a body having a first port communicating with an outlet of a master cylinder and a second port communicating with an oil passage;
  a piston arranged slidably in said body, said piston having an internal passage intercommunicating with said first and second port;
  a popper valve placed adjacent to said first port and being in contact with said internal passage of said piston;
  a resilient means arranged around said piston for separating said piston and said popper valve;
  said resilient means constructed of a single piece having first and second parallel portions, said first parallel portion having first and second ends, said second parallel portion having first and second ends, and a slanted portion in which said first end of said first parallel portion connects with said second end of said second parallel portion, said first and second parallel portions and said slanted portion having coaligned openings formed therein for guiding said piston.

2. An in-line valve of a master cylinder according to claim 1, wherein a vertical section of said resilient means is configured in a Z-shape.

* * * * *